United States Patent Office 3,397,271
Patented Aug. 13, 1968

3,397,271
ACYL SUBSTITUTED 2,2'-BIPHENYLENE CHALKOGENIDES AS INSECTICIDES
John H. Cornell, Jr., Arlington, Mass., assignor to Monsanto Research Corporation, St. Louis, Mo., a corporation of Delaware
No Drawing. Original application Aug. 24, 1967, Ser. No. 482,240, now Patent No. 3,341,552, dated Sept. 12, 1967. Divided and this application July 14, 1967, Ser. No. 671,510
5 Claims. (Cl. 424—244)

ABSTRACT OF THE DISCLOSURE

This invention is concerned with the insecticidal use of compositions of new acyl substituted 2,2'-biphenylene chalkogenides.

---

This is a division of application Ser. No. 482,240, filed Aug. 24, 1965, and now U.S. Patent 3,341,552, issued Sept. 12, 1967.

This invention relates to the reaction of 2,2'-biphenylene chalkogenides with aromatic acyl and thioacyl halides and to the products thereof.

It is an object of this invention to provide new aromatic acyl and thioacyl substituted 2,2'-biphenylene chalkogenides.

It is another object of this invention to provide new compounds useful as biological toxicants.

Still another object of this invention is to provide new compounds useful as insecticides.

These and other objects of this invention will become apparent as a detailed description of the invention proceeds.

According to the invention, there are prepared new and useful compounds having the formula:

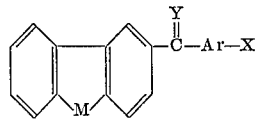

wherein M is a chalkogen element selected from the class consisting of oxygen, sulfur, selenium and tellurium, Y is a chalkogen element selected from the class consisting of oxygen and sulfur, Ar is a bivalent aromatic hydrocarbon radical of from 6 to 12 carbon atoms and X is a substituent attached to a ring carbon atom of Ar; and is a member selected from the group consisting of the nitro radical, halogen elements of atomic weight below 130 and perhaloalkyl radicals free of aliphatic unsaturation and consisting of from 1 to 6 carbon atoms.

The compounds of this invention have potent and novel biological toxicant effects. Compounds as provided by this invention display toxicant activity against pest species such as insects, as well as possessing utility as herbicides.

Preparation of the presently provided novel compounds is effected by contacting 2,2'-biphenylene chalkogenides with aromatic acyl or thioacyl halides, as illustrated in the equation:

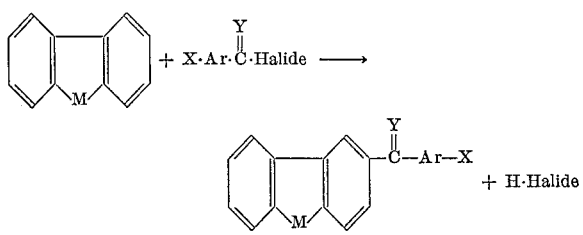

wherein M, Y, Ar and X are as defined above.

There are shown below a number of the specific new compounds of the invention. It is not intended that this be a complete listing of all the compounds of the invention, but that it merely be illustrative thereof:

2-(m-nitrobenzoyl)dibenzothiophene,
2-(4-iodobiphenylylcarbonyl)dibenzofuran,
2-(4-nitrobiphenylylcarbonyl)dibenzoselenophene,
2-(4-tridecabromohexylbiphenylylcarbonyl)dibenzotellurophene,
2-(m-trifluoromethylbenzoyl)dibenzothiophene,
2-(4-trichlormethylbiphenylylcarbonyl)dibenzofuran,
2-[4-(1-bromo-1,1,2,2,3,3,4,4-octachlorobutyl)naphthoyl]dibenzoselenophene,
2-(m-trifluoromethylbenzoyl)dibenzotellurophene,
2-(p-chlorobenzoyl)dibenzothiophene,
2-(p-chlorobenzoyl)dibenzofuran,
2-(m-nitrobenzoyl)dibenzoselenophene,
2-(4-nitrobiphenylylthiocarbonyl)dibenzotellurophene,
2-(4-bromobiphenylylthiocarbonyl)dibenzothiophene,
2-(4-iodobiphenylylthiocarbonyl)dibenzothiophene,
2-(4-tridecafluorohexylbiphenylylthiocarbonyl)dibenzoselenophene,
2-(p-nitrobenzoyl)dibenzotellurophene,
2-(4-heptaiodopropyl-2,5-diethylthiobenzoyl)dibenzothiophene,
2-(4-iodo-2,5-dimethylbenzoyl)dibenzofuran,
2-(4-nitrothionaphthoyl)dibenzoselenophene,
2-(p-triiodomethylthiobenzoyl)dibenzotellurophene,
2-(4-bromo-2-isopropylbenzoyl)dibenzothiophene, and so forth.

In preparing compounds of this invention, useful chalkogenides which may be used are: dibenzothiophene, dibenzofuran, dibenzotellurophene and dibenzoselenophene.

Useful aromatic halides are, for example:

m-nitrobenzoyl chloride,
4-iodobiphenylylcarbonyl fluoride,
4-nitrobiphenylylcarbonyl bromide,
4-tridecabromohexylbiphenylylcarbonyl iodide,
m-trifluoromethylbenzoyl chloride,
4-trichloromethylbiphenylylcarbonyl iodide,
4-(1-bromo-1,1,2,2,3,3,4,4-octachlorobutyl)naphthoyl chloride,
m-trifluoromethylthiobenzoyl iodide,
p-chlorobenzoyl chloride,
p-iodothiobenzoyl bromide,
m-nitrothiobenzoyl iodide,
4-nitrobiphenylylthiocarbonyl chloride,
4-bromobiphenylylthiocarbonyl chloride,
4-tridecafluorohexylbiphenylylthiocarbonyl bromide,
4-nitrothionaphthoyl iodide,
4-triiodomethylthionaphthoyl chloride,
4-bromo-2-isopropylbenzoyl chloride, and so forth.

In carrying out the process of this invention, the desired 2,2'-biphenylene chalkogenide is simply contacted with the aromatic halide until reaction is complete. Generally, the reaction proceeds at room temperature, and the reaction mixture may even be advantageously cooled, at least initially; it is also an advantage in moderating the reaction to add one of the reactants slowly and gradually to the other, though the reactants may optionally be added all at once, preferably together with a solvent or diluent. Solvents or diluents which may be used to moderate the reaction and to facilitate stirring, and so forth, are for example, halogenated hydrocarbons, such as 1,1,2,2 - tetrachloroethane, 1,1,1,2,2 - pentachloroethane, 1,1,1-trichloroethane, and the like.

The ratio of reactants may vary if desired, molar rations of chalkogenide to halide of at least 1:10 to about 10:1 may be used, but since the reaction takes place by the condensation of one mole of chalkogenide with one mole of halide, advantageously a 1:1 ratio of reactants is employed. Excess reactant may be removed at the end of the reaction by, for example, extraction or distillation.

Useful temperatures for conducting the preparation are, for example, the reflux temperature of the reaction mixture, or any desired temperature from below 0° C. up to below the decomposition point of the ingredients of the reaction mixture. Atmospheric pressure is satisfactory for conducting the reaction, though sub- or super-atmospheric pressures may be used if desired, ranging from 0.05 millimeters of mercury (mm. Hg) to about 5000 pounds per square inch (lbs./in.$^2$).

Catalysts such as anhydrous aluminum halides, for example, may be used if desired, but their use is not essential. Reaction time may vary. In general, it will depend on the nature of the reactants used and on the temperature of the reaction mixture. Ordinarily reaction times will vary from less than one minute to several hours.

The isolation of the product may be accomplished by general standard procedures, such as distillation, extraction, or crystallization, for example.

The present new compounds are generally stable, well defined products, soluble in alcohols, and tertiary amines, such as methanol and pyridine, for example.

The presence of the aromatic substituents imparts a biological toxicant property hitherto unknown to this class of compounds, as demonstrated by testing known acyl substituted 2,2'-biphenylene chalkogenides under the same conditions as the compounds described in this invention.

The new compounds are useful for a variety of industrial and agricultural uses; for example, the 2-(p-chlorobenzoyl)dibenzothiophene may be used as a biological toxicant and is particularly effective as an insecticide.

The invention will be further described with reference to the following specific examples. These examples are given for purposes of illustration only and are not to be taken as in any way restricting the invention.

EXAMPLE 1

This example illustrates the preparation of compounds in accordance with this invention.

To a reaction flask containing a mixture of 46.1 grams (g.) (0.25 mole) of dibenzothiophene and 46.4 g. (0.25 mole) of m-nitrobenzoyl chloride in 300 milliliters (ml.) of 1,1,2,2-tetrachloroethane, at a temperature of from 0° to 5° C. is added 34 g. (0.25 mole) of anhydrous aluminum chloride. The reaction mixture is maintained at a temperature below 5° C. and stirred vigorously for a period of 12 hours. To the reddish-brown reaction mixture is added 500 ml. of concentrated hydrochloric acid and 500 g. of ice; causing the mixture to separate into two layers. The oily layer is separated, washed several times with 10% solutions of sodium chloride and sodium carbonate, dried, and stripped. The crude product is then dissolved in pyridine and recrystallized.

The resultant solid is 2-(m-nitrobenzoyl)dibenzothiophene, a uniformly yellow crystalline product weighing 28.5 g. (35% theoretical yield), soluble in pyridine and melting at 153–156° C.

Elemental analysis of this product confirms the empirical formula $C_{19}H_{11}NO_3S$. Found: C, 68.0%; H, 3.6%; N, 4.0%. Calculated: C, 68.5%; H, 3.3%; N, 4.2%.

EXAMPLE 2

This example further illustrates the preparation of compounds of this invention.

A mixture of 46 g. (0.25 mole) of dibenzothiophene, 44 g. (0.25 mole) of p-chlorobenzoyl chloride and 34 g. (0.25 mole) of anhydrous aluminum chloride in 300 ml. of 1,1,2,2-tetrachloroethane are reacted together according to the method of Example 1.

The resultant solid is 2-(p-chlorobenzoyl)dibenzothiophene, a yellowish crystalline product weighing 34 g. (42% theoretical yield), soluble in pyridine and melting at 114–116° C.

Elemental analysis of the product confirms the assigned empirical formula $C_{19}H_{11}ClOS$. Found: C, 70.6%; H, 3.3%; Cl, 11.1%. Calculated: C, 70.6%; H, 3.5%; Cl, 10.9%.

EXAMPLE 3

This example further illustrates the preparation of compounds in accordance with this invention.

A mixture of 46 g. (0.25 mole) of dibenzothiophene, 52 g. (0.25 mole) of m-trifluoromethylbenzoyl chloride, and 34 g. (0.25 mole) of anhydrous alumina chloride in 300 ml. of 1,1,2,2-tetrachloroethane are reacted together according to the method of Example 1.

The resultant product is 2-(m-trifluoromethylbenzoyl)dibenzothiophene, a colorless crystalline material, soluble in ethanol.

Elemental analysis of the product confirms the empirical formula $C_{20}H_{11}F_3OS$. Found: C, 67.3%; H, 3.0%; S, 9.1%. Calculated: C, 67.3%; H, 3.1%; S, 9.0%.

EXAMPLE 4

This example illustrates the use of a compound of this invention as a pesticide for the destruction of lower animal life forms.

In insecticidal screening, activity for control of mosquito larvae is demonstrated as follows: 2-(p-chlorobenzoyl)dibenzothiophene is mixed with 50 ml. of water and 0.5 ml. of acetone to provide 10 parts per million (p.p.m.) concentration of the dibenzothiophene compound in the liquid. Some twenty early fourth instar yellow fever mosquito larvae (*Aedes aegypti*) are placed in the container holding the solution of the test compound and held there at room temperature for 24 hours. Now 0.1 ml. of a mixture of three standard insecticides (of the chlorinated hydrocarbon, carbamate and organic phosphorus type, respectively) in acetone, which in itself would produce about a 5% mortality rate in the larvae, is added to the solution. An 80% mortality occurs within another 24 hours in the mixture containing the chlorobenzoyl compound.

By contrast, similar administration of dibenzothiophene in which the halogen element is not present, 2-(benzoyl)dibenzothiophene, produces no effect on the test larvae.

EXAMPLE 5

This example further illustrates the use of a compound of this invention as a pesticide.

In insecticidal screening, activity for control of the common housefly (*Musca domestica*) is demonstrated as follows. One microliter of an acetone solution containing 2-(p-chlorobenzoyl)dibenzothiophene at a concentration of 10 mg./ml. is applied to the dorsum of the thorax of each test fly, the test being carried out on 48-hour old female houseflies.

The specimen flies are then held at 68° F. and in the range of from 50 to 60% relative humidity for 24 hours, prior to observation for mortality. A 30% kill is produced by the chlorobenzoyl compound when tested in the above manner.

When using the same procedure as above 2-(benzoyl)dibenzothiophene, a known related compound, produces no effect on the test insects.

The presently new compounds of this invetnion may be applied for pesticidal and herbicidal use in the form of sprays, aerosols, dusts or the like. Useful sprays may be prepared by dispersing the present products in water with the aid of a wetting agent, to prepare aqueous dispersions which may be employed as sprays. For example, a solution containing cyclohexanone and a polyalkylene glycol ether long chain alkyl benzene sulfonate emulsifier may be used to prepare such dispersions or emulsions. The products may also be applied to pests and plants as oil-in-water emulsion sprays. The present products may also be dissolved or dispersed in liquified gases such as fluorochloroethanes or methyl chloride and applied to plants or pest organisms from aerosol bombs. Instead of employing liquids as carriers and diluents, herbicidal dusts which contain the new compounds as active ingredients may be prepared, for example, by incorporating the new products of this invention with a solid carrier such as talc, bentonite, fuller's earth, and so forth.

The amount of active toxicant compounds in the composition as applied will vary with the active ingredients, the manner of applications, the species to be destroyed and the resistance of the organism to be sprayed, for example, and formulation and ratio of applications are suitably adjusted in accordance with these factors.

It is apparent that this invention may be extended to uses beyond those specifically described and that many widely differing embodiments can be made without departing from the spirit and scope thereof as defined herein. Therefore, it is not intended to be limited except as indicated in the appended claims.

I claim:
1. An insecticidal composition comprising a pesticidally effective amount of a compound of the formula:

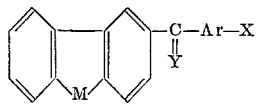

wherein M is a chalkogen element selected from the class consisting of oxygen, sulfur, selenium and tellurium, Y is a chalkogen element selected from the class consisting of oxygen and sulfur, Ar is a bivalent aromatic hydrocarbon radical of from 6 to 12 carbon atoms and X is a substituent attached to one of the ring carbon atoms comprising Ar; and is a member selected from the group consisting of the nitro radical, halogen elements of atomic weight below 130 and perhaloalkyl radicals free of aliphatic unsaturation containing from 1 to 6 carbon atoms and an inert pesticidal carrier.

2. The pesticidal composition of claim 1 together with a dispersing agent.

3. A method of controlling insects which comprises applying to said insects an insecticidally effective amount of a composition comprising a compound of the formula

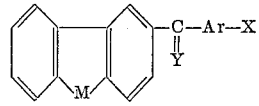

wherein M is a chalkogen element selected from the class consisting of oxygen, sulfur, selenium, and tellurium, Y is a chalkogen element selected from the class consisting of oxygen and sulfur, Ar is a bivalent aromatic hydrocarbon radical of from 6 to 12 carbon atoms and X is a substituent attached to one of the ring carbon atoms comprising Ar, and is a member selected from the group consisting of the nitro radical, halogen elements of atomic weight below 130 and perhaloalkyl radicals free of aliphatic unsaturation and containing from 1 to 6 carbon atoms.

4. The method of claim 3 in which said composition contains an inert carrier.

5. The method of claim 3 in which said composite contains an inert carrier and a dispersing agent.

References Cited

Williams, Detoxication Mechanisms (1947), pp. 194–195.

Burger, (I), Journal of the Am. Chem. Soc. 78, 4419 (1956).

Burger, (II), Medicinal Chemistry (1960) pp. 77–78.

Buu Hoi, Chemical Abstracts, 53, 10164d (1958).

ALEBRT T. MEYERS, *Primary Examiner.*

S. FRIEDMAN, *Assistant Examiner.*